April 4, 1944.  H. V. SCHWEITZER  2,345,834
PAINTING MACHINE
Filed Oct. 1, 1941  7 Sheets-Sheet 1

INVENTOR
HOWARD V. SCHWEITZER
BY
Ely & Frye
ATTORNEYS

April 4, 1944.    H. V. SCHWEITZER    2,345,834
PAINTING MACHINE
Filed Oct. 1, 1941    7 Sheets-Sheet 2

INVENTOR
HOWARD V. SCHWEITZER
BY
Ely & Frye
ATTORNEYS

April 4, 1944.   H. V. SCHWEITZER   2,345,834
PAINTING MACHINE
Filed Oct. 1, 1941   7 Sheets-Sheet 7

INVENTOR
HOWARD V. SCHWEITZER
BY Ely & Frye
ATTORNEYS

Patented Apr. 4, 1944

2,345,834

UNITED STATES PATENT OFFICE 2,345,834

PAINTING MACHINE

Howard V. Schweitzer, Shaker Heights, Ohio

Application October 1, 1941, Serial No. 413,173

19 Claims. (Cl. 91—45)

This invention relates to an improvement in coating machinery and, more particularly, to an automatic machine for coating, i. e., painting, large curved sheet metal surfaces, such as automobile hoods, fenders, panels, and the like.

It is the primary object of this invention to provide an automatic machine which will apply to large curved surfaces a substantially uniform coat of paint over the entire surface.

It is, therefore, an object of this invention to provide a machine which will revolve an article to be painted and simultaneously move a gun along a linear path substantially constantly spaced from the surface generated by the revolved article, maintain the gun substantially normal to the surface generated, and control the instant speeds of travel of the gun so that the gun moves at a rate substantially inversely proportional to the circumference of the circles generated by the corresponding instant points to which the gun is normal.

Another object of this invention is to provide a machine which will apply successive coats to a plurality of articles. A further object of this invention is to provide a machine which will permit the path and the angle of the gun to be readily determined for a specific article to be painted in the machine. It is also an object of this invention to provide means to regulate the guns so that they operate only when directed toward the object being painted.

Still other and further objects and advantages of this method will be apparent from the following specification, claims, and drawings of one embodiment of my invention. In the drawings:

In the drawings, in which like reference characters refer to like parts, I have shown, for simplicity of illustration, my machine set up for automatically painting automobile hood panels. Where moving parts of the machine are shown in solid lines, except in Figs. 4 and 5, the parts are in the position found when the spray gun is at the top of its stroke. The position of parts of the machine in other phases of the cycle of operation are indicated by the usual "phantom" showing, i. e., by light dot and dash lines. The directions employed in describing this invention are defined as follows: "Forward" denotes a direction toward the spindles, "rear" or "rearwardly" denotes a direction away from the spindles, "outside" denotes a direction away from the adjacent booth, and "inside" denotes a direction toward the adjacent booth.

Figure 1:
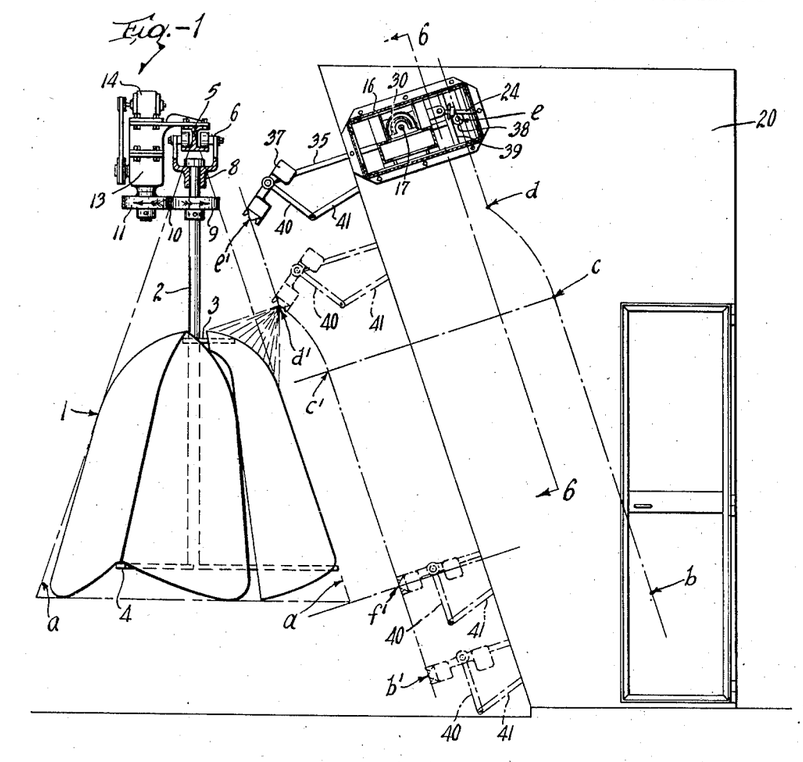
Fig. 1 is an elevation taken along the line 1—1 of Fig. 2 showing a painting machine made according to this invention and also showing one gun at the top of its stroke and indicating the position of the gun at the bottom of its stroke and in intermediate positions.
Figure 2:
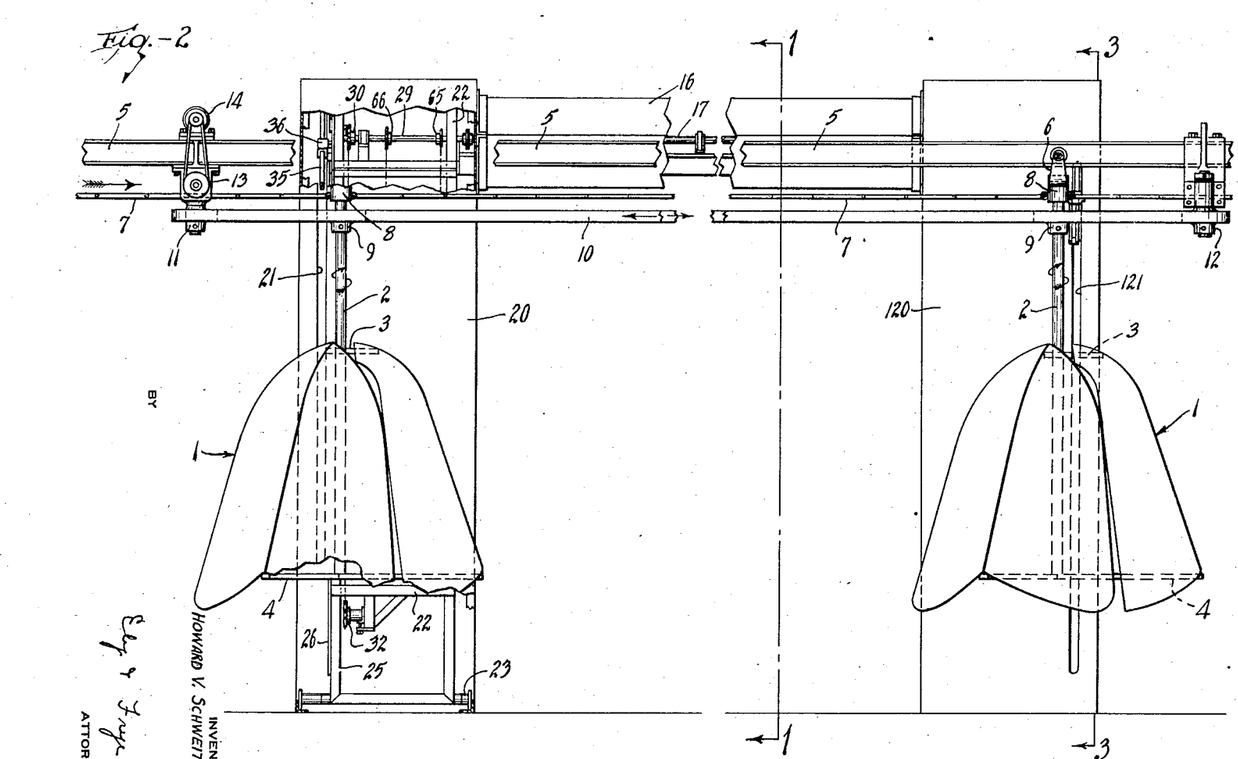
Fig. 2 is a front elevation, partly broken away, of the machine shown in Fig. 1.

The hoods to be painted, 1, are mounted on spindles 2 by means of suitable spacing and supporting frame members 3 and 4 carried by the spindles. Each of the spindles 2 are conveyed by a suitable conveyor system so that each spindle will remain for a predetermined period before and aligned with the spray guns of the gun carriage booths 20 and 120. In the embodiment of this invention as shown in Figs. 1 and 2, the conveyor system is a conventional monorail system comprising an I-beam 5 along which evenly spaced hangers 6 are pulled by the conveyor chain 7. This monorail system may conveniently be part of or associated with the conveyor system in the factory in which the painting machine is installed. By a suitable and conventional conveyor drive, not shown, the conveyor system is driven so that a hanger will remain at a given position for a known period of time and then the conveyor will be advanced until a succeeding hanger reaches the position occupied by the preceding hanger. Thus, the cycle of operation of the monorail conveyor system is made up of alternate stationary and advancing periods.

Each spindle 2 is mounted in a bearing 8 which permits the spindle 2 to be rotated in the hanger 6 by a spindle pulley 9, preferably mounted on the spindle adjacent the hanger bearing 8. The spindle drive comprises a belt 10 driven on the drive pulley 11, mounted beyond one end of the gun carriage booths, and the idler pulley 12, mounted beyond the other end of the gun carriage booths, as shown in Fig. 2. The drive pulley 11 may be driven through a speed reducer 13 by a motor 14 mounted on the rail 5, as shown in Figs. 1 and 2, or from any other conventional support. The drive pulley 11 and idler pulley 12 are mounted with respect to the conveyor system so that the spindle pulleys 9 will be engaged by the belt 10 as they are stationed before the gun carriage booths 20 and 120.

The main gun carriage booth 20 houses the gun carriage drive control, a gun carriage track, and gun carriage and is provided with a vertical slot 21 through which a gun arm extends. The booth 20 is positioned adjacent the conveyor so that the spray gun carried by the gun arm will be aligned with the axis of a spindle 2 during a stationary period of the conveyor travel. The auxiliary gun carriage booth 120 corresponds to the main booth 20, except that it does not house a gun carriage drive control. Consequently, it is provided with a vertical slot 121 in which a gun arm extends, the auxiliary booth 120 being positioned with respect to the conveyor system so that a spray gun carried by its gun arm will be aligned with the axis of a spindle 2 during the stationary period of the conveyor system. The main booth 20 and auxiliary booth 120 are connected by conduit 16, which houses the shaft 17 connecting the carriage drive shafts of the two booths.

*Operation of the conveyor system and spindle drive*

The unpainted automobile hoods 1 are loaded on the frames 4 at a suitable loading station (not shown). In the machine disclosed, the frame 4 positions the automobile hoods 1 so that their surfaces will lie approximately upon a solid of revolution, approximately defined as a cone with a rounded apex or as a paraboloid, when the spindle 2 is rotated on its axis. In the particular embodiment disclosed, three hoods 1 may be hung on a single frame 4. As is also shown in Fig. 1, edge and other portions of the hoods 1 may depart somewhat from the theoretical surface of a solid of revolution, such as the cone indicated by the element lines a, but such a minor deviation from the true surface of a solid of revolution has been found to make no serious practical difference in the results obtained.

As the spindles 2 are periodically advanced toward the booth 20, the pulleys 9 will engage the belt 10, commencing to rotate the spindles 2, as they come to a stop before the booth 20. In practice, it is preferable to drive the pulley 11 so that the portion of the belt 10 which engages the pulleys 9 will be driven in the same direction in which the chain 7 advances. Thus, the acceleration of rotation of the spindles 2 will be more gradual than if the belt 10 were driven oppositely and the spindle 2 will be rotating at substantially the desired speed when the spindle's forward motion ceases in front of the booth 20.

While the conveyor drive is stationary, the spray gun of the booth 20 paints the surface of the hoods 1 in a manner to be described in greater detail below. Then the conveyor advances until the hoods which have received a first coat stop before the booth 120, where a second coat is applied. The spindles are then advanced beyond the belt 10 to a suitable unloading station, passing through a drying chamber if necessary.

In the embodiment disclosed, a two-coat machine is shown. Obviously, if but one coat is required, the auxiliary booth 120 is not employed and, if more than two coats are required, additional auxiliary booths may be added by means of suitable connecting shafts and counter-shafts, the distance between the paths of travel of the spray guns in the booths preferably being multiples (including 1) of the distances traveled by the spindles in one period of advancement of the conveyor system.

*Gun carriage and tilting mechanism*

In the embodiment shown in Figs. 1 to 4 of the drawings, booths 20 and 120 correspond, except that the main booth 20 houses the carriage drive control system. For clarity of illustration, the gun carriage, carriage drive, and gun tilting mechanism in the auxiliary booth 120 have been shown in detail in Figs. 3 and 4 and will be described in the following paragraphs. Corresponding parts will be found in the main booth. (Parts in the main booth 20, where shown and indicated by reference characters, will be denoted by numerals from 22 to 41, and corresponding parts in the auxiliary booth 120 will be denoted by numerals from 122 to 141.)

Figure 3:
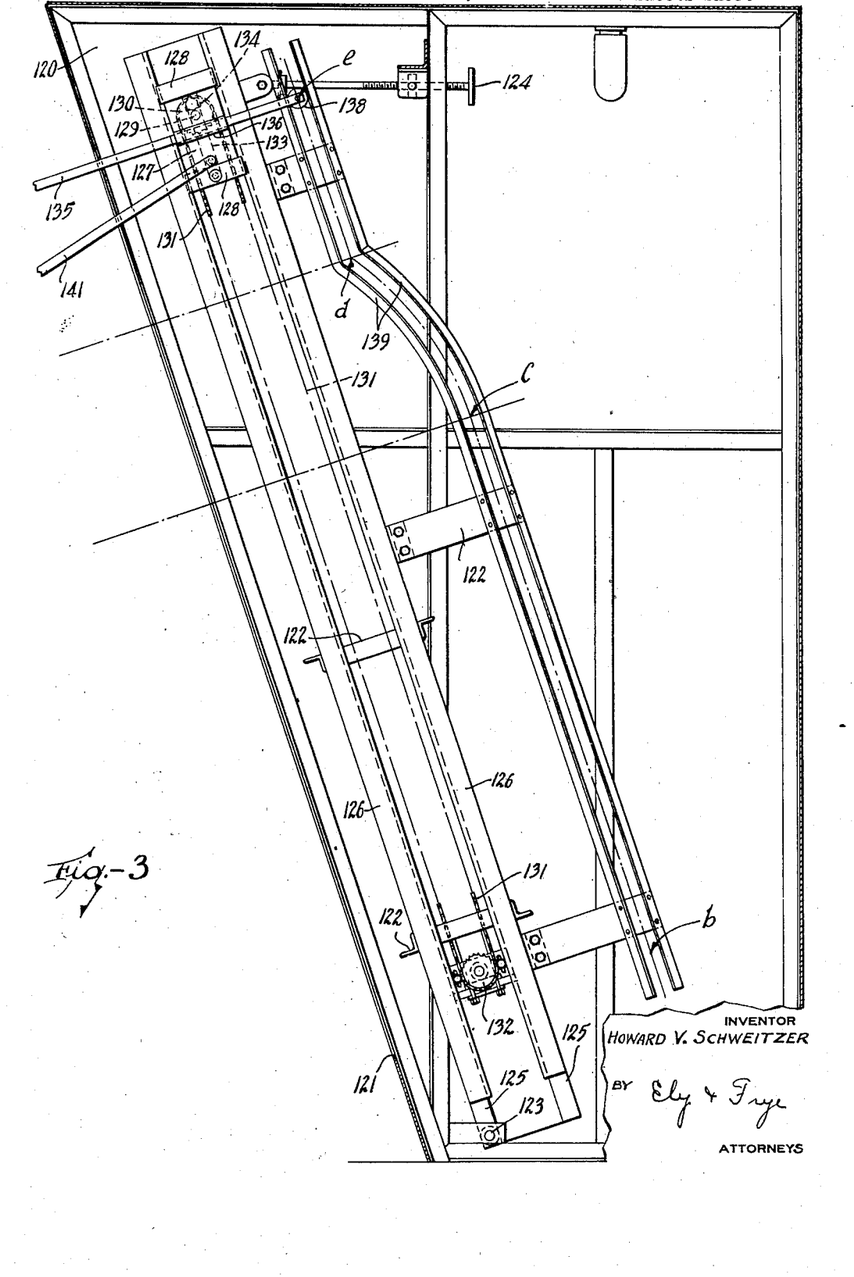
Fig. 3 is a sectional view taken along the line 3—3 of Fig. 2 to show a gun carriage, carriage track, and cam track.
Figure 4:
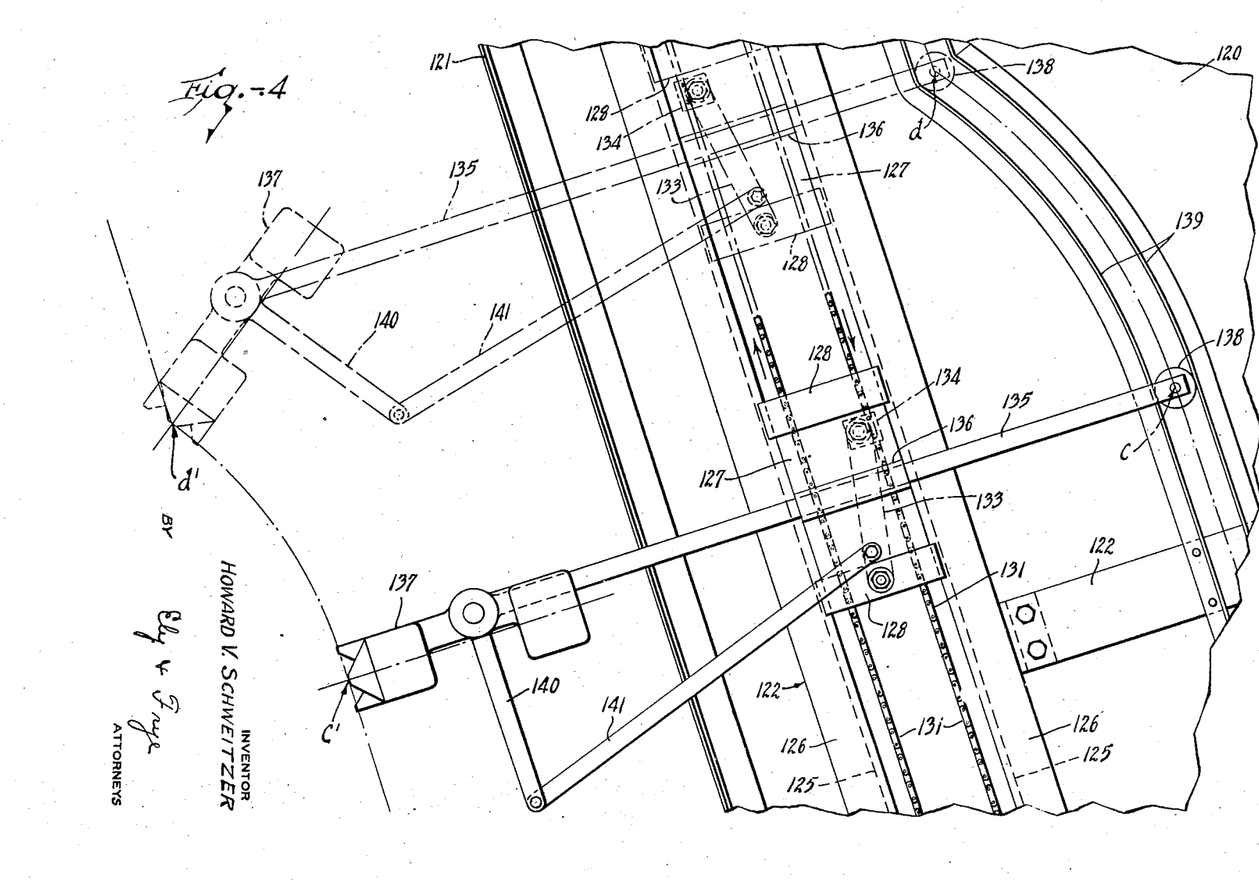
Fig. 4 is an enlarged fragmentary detail view taken from Fig. 3 to show the operation of the gun carriage drive and gun tilting mechanism. In this view the moving parts shown in solid lines are not indicated in their relative positions when the gun is at the top of its stroke.

In the auxiliary booth 120, a chassis 122 is housed. In order to permit an adjustment of the slope of the carriage travel, the chassis 122 may be mounted on the pivot 123 and held in its adjusted slope by the adjustment screw 124. On the outside longitudinal rails 125 of the chassis are mounted the carriage guides 126, which are preferably a pair of evenly spaced flat members providing flanges extending inwardly of the rails 125.

A carriage 127, comprising a plate, is mounted so that it may slide in the space between the guides 126. The carriage 127 carries four flange plates 128 (two at each end) which engage the flanges provided by the guides 126 and hold the carriage in the guides. Journaled in the upper end of the chassis 122 is a carriage drive-shaft 129 (connected to the carriage drive connecting shaft 17 by means of a suitable universal joint) which carries at its outside end, but inwardly of the guides 126, a carriage drive sprocket 130 which drives the carriage drive chain 131 extending between the drive sprocket 130 and the idler sprocket 132 mounted near the lower end of the chassis 122. The carriage 127 is connected to the drive chain 131 by means of a connecting rod 133 pivotally mounted on the inside of the carriage and also pivotally connected to a block 134 carried by the chain 131.

A gun arm 135 is journaled for longitudinal movement in any suitable bearing 136 on the outside of the carriage 127 and extends through the slot 121 of the booth. At the forward end of the arm 135, outside the booth, a spray gun 137 is pivotally mounted, preferably offset, so that, when the spindles 2 are held before the booth 120 in the stationary period of the chain 7, the gun 137 will be aligned with the axis of a spindle 2. The rear end of the arm 135 within the booth is provided with a cam follower 138 which runs in the gun cam tracks 139 carried by the chassis 122. Integral with or fixed to the gun 137 is a gun tilting crank arm 140 pivotally connected to the gun tilting connecting rod 141 which, in turn, is pivotally connected to the carriage 127. The gun 137 is preferably of the automatic plunger type. Connected to the gun 137, therefore (but, for simplicity of illustration, not shown), is a flexible tube connected to a suitable source of paint supply, another tube is connected to a supply of air for spraying paint and a third tube is connected to a supply of air for operating the gun through a suitable gun control valve.

*Operation of spray gun, gun carriage, and gun tilting mechanism*

As shown in Figs. 3 and 4, the operation of the carriage drive is as follows. The shaft 129 is driven by the gun carriage drive control system, the construction and operation of which is described in detail below, so that the chain 131 is driven at the desired speed and in synchronism with the conveyor system drive. As the chain 131 is driven around the drive sprocket 130 and the idler sprocket 132, the carriage 127 is pushed down and pulled up the track guides as the block 134 is carried around by the chain, as shown in Fig. 4, thus reciprocating the carriage 127 in the guides 126. Because the block 134 pushes the carriage connecting rod 133 and the carriage 127 ahead of it but pulls the carriage after it, the guides 136 should extend below the idler sprocket 132, but need not extend so far above the drive sprocket 130, in order to support the carriage during the comparative dwell in its reciprocating motion which results when the block 134 passes around the sprockets 130 and 132.

As the carriage 127 reciprocates in its track, the gun arm 135 is obviously carried with it and the cam follower 138 moves in the cam track 139. Between the points b and c, the center line of the cam track is parallel with the carriage track and the approximate element a of the solid generated by the revolved hoods. Between these points, the gun arm 135 will be fixed relative to the carriage and the gun 137 will be fixed relative to the gun arm. From the point c to the point d, however, the cam track is curved forwardly. Thus, on the upstroke of the carriage, the gun arm 135 will be moved forward in its bearing 136 and, due to the crank arm 140 and tilting connecting rod 141, the gun 137 will be simultaneously and gradually tilted downwardly, while the nozzle tip moves from the point c' to d' along its path of travel, as shown in Fig. 4. From the point d to the point e, which is at the top of the carriage stroke, the cam track 139 is parallel to the carriage track so that between the points d and e the gun arm 135 will remain in the position with respect to the carriage 127 that was obtained at the point d and the spray gun 137 will reach the top of its stroke at e' in the tilted position obtained at the point d'. On the downward stroke of the carriage the sequence of movements of the gun arm and spray gun will, of course, be reversed.

Assuming the operation of the carriage drive control to be as described and explained hereinafter, the painting operations of the machine disclosed in Figs. 1 to 4 may be best described by referring to Fig. 1. Fig. 1 is an end elevation of the main booth 20. As explained above, insofar as the carriage and associated mechanisms are concerned, their parts correspond in both the main and auxiliary booths 20 and 120. Therefore, the points in the paths of travel of the gun 37 and cam follower 38 correspond with those of the gun 137 and follower 138 and, consequently, are denoted by the same reference letters. The timing of the strokes of the gun 37 is so synchronized with the conveyor system that the period of advancement of the conveyor chain 7 occurs only while the gun 37 is near and at the top and/or bottom of its stroke in order that the gun 37 will be spraying only while the hanger 8 is stationary but while the spindle 2 is being rotated rapidly at a substantially constant speed by the belt 10. In other words, while a rotated spindle 2 is stationary before a carriage booth, the gun will spray during one upward or downward stroke. Ordinarily, the conveyor will advance a succeeding spindle into position between spraying periods of the gun, although, obviously, the spindle may remain in position before a carriage booth for any desired number of strokes of the spray gun.

Assuming that the machine disclosed advances the articles to be painted during the interim between each upward or downward stroke of the gun, in Fig. 1 the spindle 2 is advancing toward its position in front of the booth 20 and the spray gun 37 is at its comparative dwell while the chain block 34 passes over the drive sprocket 30. Then the carriage 27 accelerates rapidly and then commences to decelerate, the gun 37 approaching the point d' at a high rate of speed. By the time the gun has reached the point d', the spindle 2 has become stationary before the booth 20 in line with the path of the gun 37 and the hoods 1 are being revolved at a substantially constant speed. When the gun reaches the point d', it is normal to the surface of the approximate solid of revolution generated by the revolving hoods and the gun commences to spray. From the point d' to the point c', because the somewhat spherical surface, which the spray from the gun is covering, is increasing in area at an increasing rate, the speed of the gun along its path d'—c' is decelerated at a rate substantially inversely proportional to the increasing circumferences of the circles described by the points on the hood to which the gun is instantly normal. This deceleration is secured by the carriage drive control system and provides that a substantially even coat of paint will be applied to each unit of area on the hoods 1. Also, while the gun is moving from d' to c', it is being moved rearwardly by the follower 38 in the cam track 39 and tilted upwardly by the crank arm 40 and tilting connecting rod 41 to maintain the gun substantially constantly spaced from and normal to the revolving hoods 1. From the point c', where the gun is normal to the point where the element of the approximate solid generated by the hoods changes from a curved line to a straight line, to the point f', where the gun is normal to the base of the said solid and where the spray is shut off, the gun continues to decelerate because the area of the hoods being covered by the spray is increasing. Because the gun will travel at less than its average speed at f', the gun is preferably accelerated in its travel from f' to b', the point of comparative dwell at the end of its downward stroke, and then decelerated from b' to f' on its upward stroke. As the gun moves from f' to b' back to f', where the spray is turned on, a succeeding spindle 2 is positioned in line with the gun by the conveyor system. The gun obviously follows the path of the downward stroke on its upward stroke and is accelerated from the point f' to near the point d' at the same rate that it was decelerated on its downward stroke, the spray being shut off and the spindle 2 commencing to advance just after the gun passes the point d'. As the gun approaches the point e', it decelerates to its comparative dwell at the end of its stroke, thus completing the cycle.

Since the shaft 17 connects the drive shaft 29 of the booth 20 with the drive shaft 129 of the booth 120, and since a spindle 2 which is positioned in front of booth 20 during one stationary period of the conveyor system will be positioned before the booth 120 in a subsequent stationary period, it is obvious that, by positioning the spray gun 137 with respect to the gun 37 so that both guns are simultaneously at the top of their strokes, hoods which receive a first coat from the gun 37 will receive a second coat in the same manner from the gun 137.

*Construction and operation of modified gun positioning and tilting mechanism*

Figure 5:
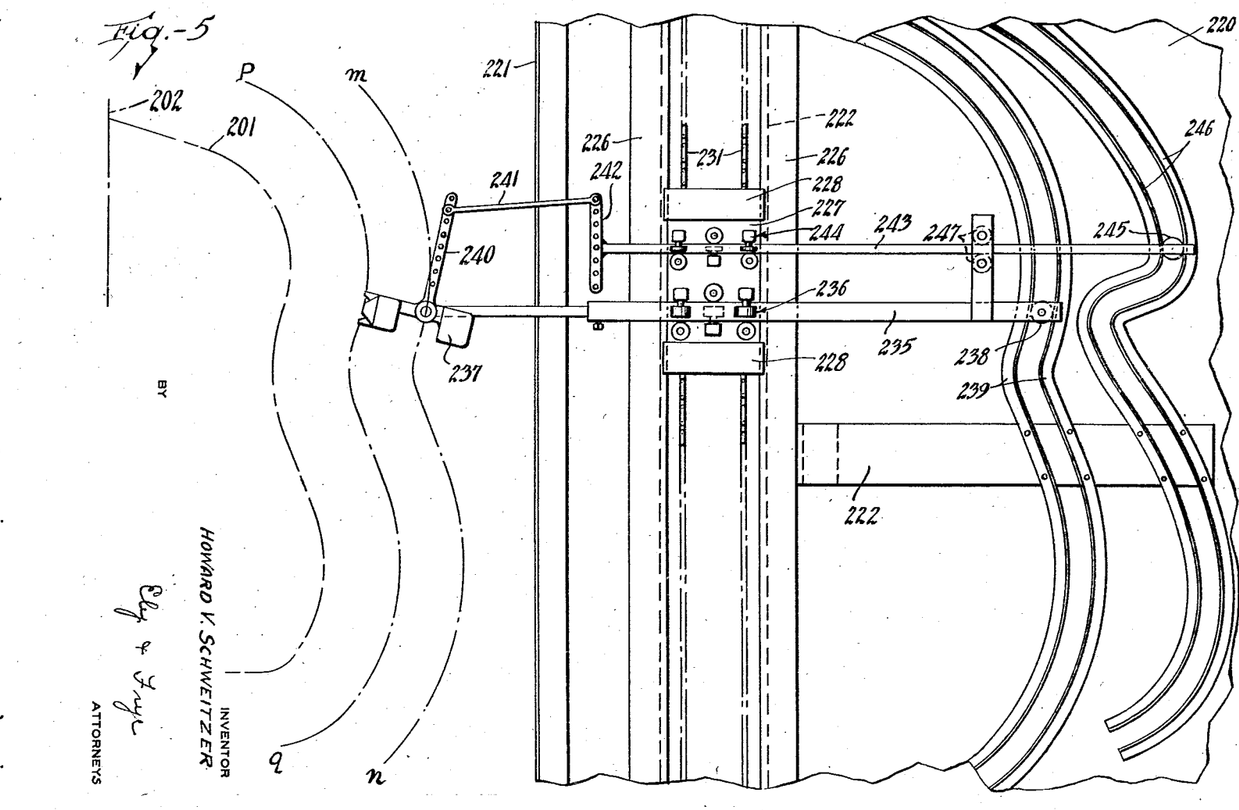
Fig. 5 is a view similar to Figs. 3 and 4 but partly diagrammatic, showing a modified gun tilting mechanism. In this view the moving parts shown in solid lines are not indicated in their relative positions when the gun is at the top of its stroke.

From the foregoing description of the machine shown in Figs. 1 to 4, it should be apparent that, due to the fixed length of the crank arm and connecting rod in the gun tilting mechanism, the mechanism as shown in Fig. 4 is suitable for only a limited range of curves. Therefore, while the mechanism shown is satisfactory for positioning and tilting the gun when painting simple curved surfaces, i. e., where the curvature is always in one direction. Thus, for example, in the hoods shown the curvature is always downward. The mechanism is not usually suitable, however, for painting pieces having a complex curvature, such as reentrant curves which may curve downwardly at some points and upwardly at others. While such reentrantly curved pieces could be painted with the mechanism shown in Fig. 4 by providing a gun arm with a plurality of guns, each with individual tilting cranks and connecting rods, for painting several differently curved areas, a preferred gun positioning and tilting device is shown in Fig. 5. The mechanism shown in Fig. 5 is operable to paint with one gun a reentrantly curved piece and is also adjustable to paint pieces having entirely different reentrant curves, though different cam tracks are required, of course, for each different type of reentrantly curved pieces. This result is obtained by providing means to tilt the gun independently of the means to position the gun (i. e., with respect to the carriage track) instead of means in which the tilting is dependent upon the positioning of the gun, as in Figs. 1 to 4.

In Fig. 5, the axis of the rotated spindle is indicated diagrammatically as 202 and the curved surface of the reentrantly curved piece to be painted is indicated diagrammatically as 201. The booth 220, having a gun arm slot 221, houses a fixed vertical chassis 222 carrying guide tracks 226 in which the carriage 227, having flange plates 228, is reciprocated by the chain 231 through a suitable connecting link (not shown). The chain 231 is driven from a carriage drive shaft controlled by a suitable carriage drive control system. The carriage 227 is provided with a set of anti-friction rollers 236 in which the gun arm, preferably telescopic, is journaled for horizontal movement. On the forward end of the arm 235 is pivotally mounted the spray gun 237; on the rear end of the arm 235 is mounted the cam follower 238 which runs in the gun positioning cam track 239. Fixed to or integral with the gun 237 is the tilting crank arm 240 to which the gun tilting connecting rod 241 is pivoted in one of the several pivot holes in the crank arm 240. The connecting rod 241 is pivoted at its other end in one of the several pivot holes in the vertical T-bar 242 fixed to the forward end of the horizontal tilting cam rod 243. The tilting cam rod 243 is journaled in the set of anti-friction rollers 244 carried by the carriage 227 for horizontal movement parallel to the gun arm 235. The rear end of the cam rod 243 is provided with a cam follower 245 which runs in the gun tilting cam track 246. Near its rear end the cam rod 243 may be additionally supported by anti-friction rollers 247 carried by the gun arm 235.

The operation of my modified gun positioning and tilting mechanism is as follows: As the carriage 227 is reciprocated in the track 226, the follower 238 in the track 239 will displace the gun arm 235 so that the pivot point of the gun 237 will follow the path *m—n*. Simultaneously, the tilting cam follower 245 running in the track 246 will displace the cam rod 243 horizontally and, through the T-bar 242, connecting rod 241, and crank 240, will tilt the gun 237 so that its nozzle will follow the path *p—q* and will always be normal to the surface being painted. It is obvious, of course, that to apply an even coat of paint to each unit of area in the surface 201, the speed of travel of the carriage 227 must be accelerated or decelerated as the area being painted decreases or increases.

It is also apparent from Fig. 5, that by extending or shortening the telescopic gun arm 235 and changing the pivot points of the connecting rod 241 or employing longer or shorter connecting rods, the mechanism will be adjustable for a wide variety of differently curved pieces, although different cam tracks 239 and 246 may have to be employed for different pieces and the carriage drive control system may have to be retimed for different pieces.

*Construction of carriage drive control system*

As is apparent from the above description of the operation of the spray guns and carriage drive for a machine made according to my invention, the carriage drive control system is an essential part of my machine when the speed of travel of the carriage is to be varied. A carriage drive control system for the machine illustrated in Figs. 1 to 4 is shown in Figs. 6 to 9 of the drawings.

Figure 6:
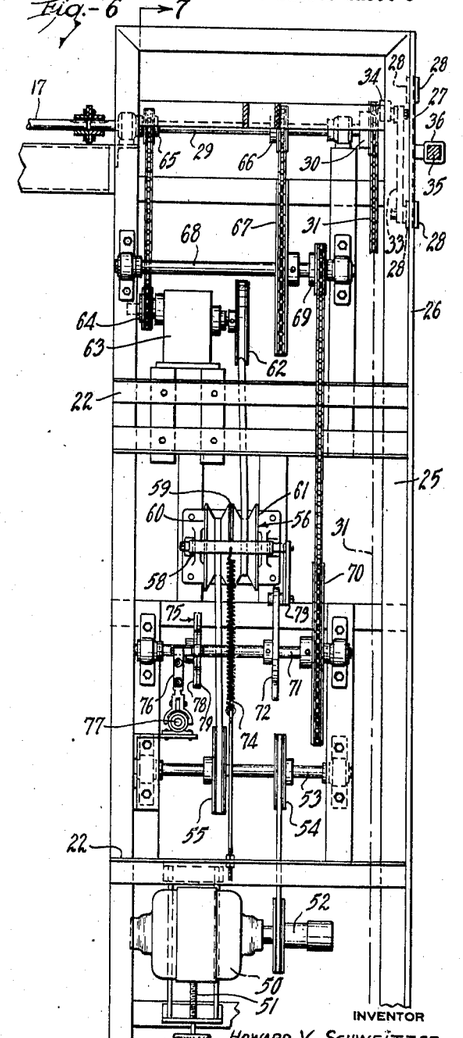
Fig. 6 is a fragmentary detail elevation taken along the line 6—6 of Fig. 1 to show the gun carriage drive control.
Figure 7:
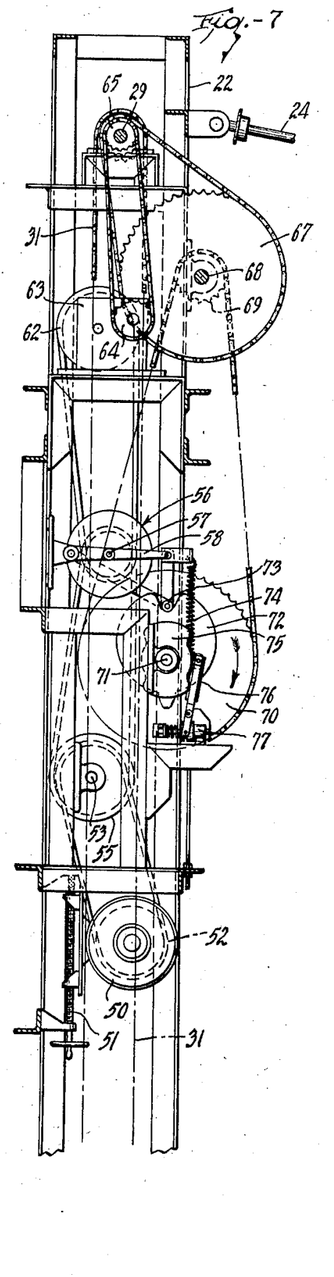
Fig. 7 is a fragmentary detail end section taken along the line 7—7 of Fig. 6.

As shown in Figs. 6 and 7, the carriage drive control system comprises a motor 50 mounted on the chassis 22 by means of an adjusting screw 51. The motor 50 drives the speed changing expansible pulley 52 which, in turn, drives the timer driving shaft 53 through the pulley 54. Mounted on the timer driving shaft 53 is a timer driving pulley 55 which drives the double expansible pulley 56 mounted on the rocking shaft 57 carried by the pivoted yoke 58. The double expansible pulley 56 is comprised of an axially shiftable center member 59 forming a driving V-belt pulley in combination with the first axially fixed member 60 and a driven V-belt pulley in combination with the second axially fixed member 61. The double expansible pulley 56 drives the driven timer pulley 62 mounted on the input shaft of the speed reducer 63. The output shaft of the speed reducer 63 carries a sprocket 64 which drives the carriage drive shaft 29 through the drive shaft driving sprocket 65.

Also mounted on the carriage drive shaft 29 is a timer cam sprocket pinion 66 which drives a counter-sprocket gear 67 mounted on the counter-shaft 68. Also fixed on the counter-shaft 68 is a counter-sprocket pinion 69 which drives the timer cam sprocket gear 70 mounted on the timer cam shaft 71. The fixed speed ratio of the timer cam sprocket pinion 66 to the timer cam sprocket gear 70 is such that the number of revolutions of the carriage drive shaft 29 sufficient to drive the carriage chain 31 completely around once will revolve the timer cam shaft 71 once. In other words, for every complete cycle of the block 34 from its position at the top of the carriage stroke, as shown in Fig. 6, around the idler sprocket 32 back to its position at the top of the carriage stroke, the timer cam shaft 71 will have made exactly one revolution. Obviously, the only purpose of the counter-shaft 68 and sprocket gear 67 and pinion 69 is to permit the required speed reduction between the carriage drive shaft 29 and timer cam shaft 71. Depending upon the convenient gear and pinion sizes which the size of the machine will permit, the speed reduction between the shaft 29 and shaft 71 may be made in any convenient number of stages, including a direct drive from the shaft 29 to the shaft 71.

Fixed to the timer cam shaft 71 is the carriage drive timer cam 72 which is engaged by the follower 73 carried by the yoke 58, the follower 73 being held in contact with the cam surface by means of the spring 74 extending from the yoke 58 to the chassis 22. Also fixed to the timer cam shaft 71 is the adjustable double "on" and "off" cam 75 which is engaged by the spring-pressed follower 76 which operates the valve 77 in the gun operating air line (not shown).

*Operation of the carriage drive control system*

The operation of the carriage drive control system for the machine illustrated in Figs. 1 to 4 is as follows: With the motor 50 driving the pulley 52, the driving diameter of the expansible pulley 52 is adjusted by means of the screw 51 until the speed of the carriage drive shaft 29 is such that it is in phase with the conveyor system, that is, the time required for one or any whole number of strokes of the carriage 27 will be precisely equal to the time required for one stationary period and one advancing period in the conveyor system and the carriage will reach an end of its stroke preferably during the middle of the advancing period of the conveyor. By employing V-belts, gearing, and chain drives throughout the control system, the system will maintain the carriage 27 in phase with the conveyor system, the very small amount of slippage, if any, in the V-belts being substantially constant in each cycle.

Figure 8:
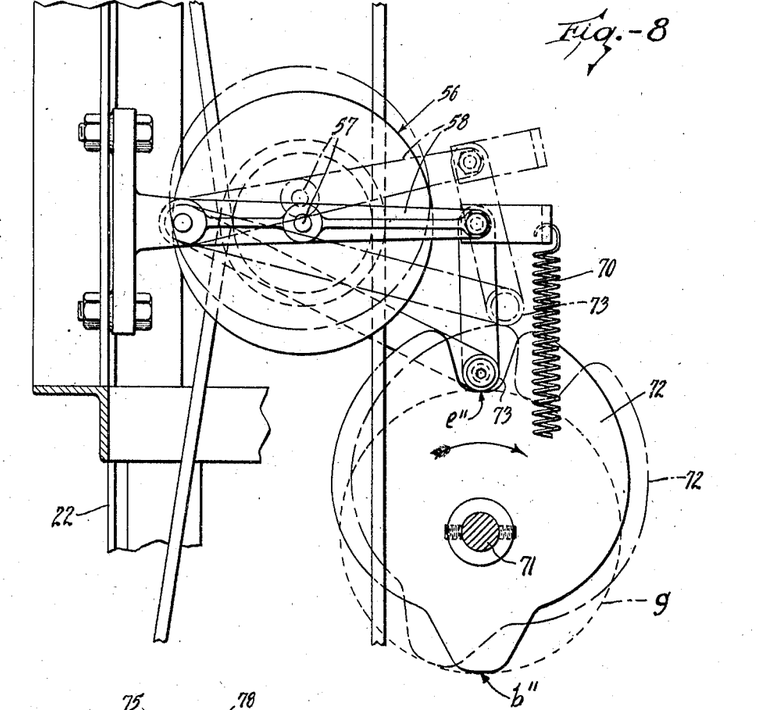
Fig. 8 is an enlarged detail view of the carriage drive timer cam.

With the yoke 58 in the center position, as shown in solid lines in Figs. 6 to 8, no speed change is caused by the expansible pulley 56. If the yoke is pivoted upwardly, however, the tension on the belt from the pulley 55 will push the center member 59 toward the driven member 61, decreasing the driving diameter between the member 60 and the member 59 and increasing the speed of rotation of the double expansible pulley 56. At the same time, the driving diameter between the member 59 and the member 61 will be increased and thus further increasing the speed of the driven timer pulley 62. Thus, it will be seen that by pivoting the yoke 58 upwardly, the speed of the carriage driving shaft 29 will be increased and the carriage 27 will be accelerated. Conversely, if the yoke 58 is pivoted in the opposite direction, the speed of the carriage driving shaft will be decreased and the carriage will be decelerated. Thus, upward movement of the yoke accelerates the carriage; downward movement decelerates the carriage, and, when the yoke is held in a fixed position, the speed of the carriage is constant, though the rate of speed depends upon the angle of the yoke. Consequently, with the carriage at the top of its stroke and the cam 72 engaged by the follower 73 at the point $e''$, it is obvious that the shaft 29 is rotating at its average speed, because the yoke 58 is at its medial position, and, further, that the circle $g$ represents the locus of points on the cam at which the shaft 29 will rotate at its average speed.

As is apparent from Fig. 8, as the cam 72 rotates, the follower will ride on the dwell adjacent the point $e''$ (corresponding to the dwell in the carriage travel as the block 34 moves around the sprocket 30) and then will be rapidly raised upwardly (consequently rapidly accelerating the carriage), until it reaches the point of maximum elevation as shown in the "phantom" lines of the drawings. (This position corresponds approximately to the position $d'$ of the path of the gun travel.) Then the follower tends to drop, decelerating the carriage, until the position of minimum elevation is reached (corresponding approximately to the position $f'$ of the path of the gun travel). Then the follower 73 is rapidly raised, accelerating the carriage, until it approaches the dwell adjacent the point $b''$, which is diametrically opposite the point $e''$ (corresponding to the position of the gun at the bottom of its stroke). Since the cam 73 is symmetrical, on the upstroke the carriage will be rapidly decelerated and then accelerated until it approaches the top of its stroke, when it will rapidly decelerate as it reaches the dwell at the top of its stroke because the cam follower rapidly drops and then is raised until it drops into the dwell adjacent the point $e''$. From the foregoing, it is apparent that the desired acceleration and deceleration of the carriage travel is obtained from the contour of the timer cam 72 and that the instant speed of the gun is approximately proportional to the radial distance from the center of the shaft 71 to the point at which the cam 72 is engaged by the follower.

Figure 9:
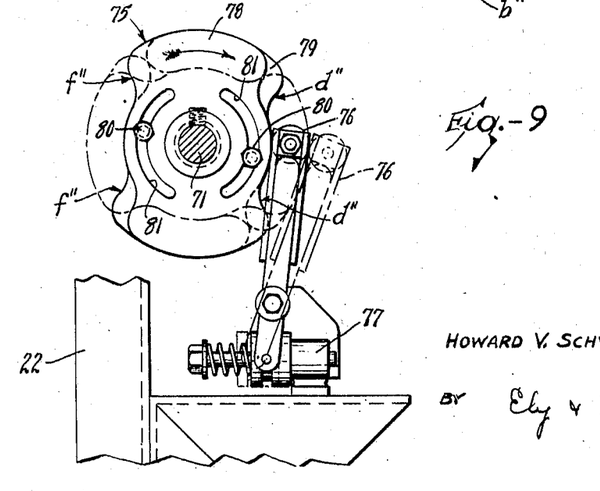
Fig. 9 is an enlarged detail view of the spray gun timer cam.

The "on" and "off" cam 75 is comprised of an "off" plate 78 secured to the cam shaft 71 and an "on" plate 79 which may be indexed around the shaft 71 with respect to the "off" plate 78 by means of the bolts 80 located in the arcuate slots 81 of the plate 78 and threaded in the plate 79. Both plates are provided with opposite concentric outer arcuate "on" cam surfaces and opposite inner arcuate "off" cam surfaces. With the plates 78 and 79 indexed with respect to each other and with respect to the shaft 71 as shown in Fig. 9, the cam follower will ride on the "off" surfaces of the cam 75 until it engages the point $d''$ of the "on" cam 79, where the follower 76 will ride up on the "on" surfaces of the cam, as shown in the "phantom" position, opening the spray gun operating air valve 77 and turning the spray guns 37 and 137 on at the point $d'$ on the down stroke of the guns. The follower 76 will continue to ride on the "on" surfaces of the cam 75 until it reaches the point $f''$ of the "off" cam 78, where it will fall on the "off" surfaces of the cam 75, shutting off the spray guns at the point $f'$ on the down stroke of the guns. As the shaft 71 continues to rotate, the follower 76 will engage the point $f''$ on the "on" cam, turning the spray guns on at the point $f'$ on the upstroke of the guns and then will engage the point $d''$ on the "off" cam, shutting the spray guns off at the point $d'$ of the upstroke of the guns, thereby completing the cycle. From the foregoing, it is apparent that the length of time the spray guns operate in any stroke is controlled by the length of the "on" surface of cam 75 and that relative phase of the stroke in which the guns operate is controlled by the indexing of the cam 75 on its cam shaft. Further, the type of spray gun control afforded by the "on" and "off" cam will permit many variations in the spray time with respect to the cycle of operation of the gun carriage. Thus, if it is desirable to have the guns turn on and off several times during the cycle, the number of "on" surfaces in the cam should be increased; or, if it is desired to have the guns spray only during "down" strokes, for example, only one "on" surface need be employed, or the length of the "on" surfaces may be cut in half and the speed of the cam shaft doubled with respect to the speed of the shaft of the carriage timer cam.

From the foregoing, it is apparent that a machine made according to this invention is not limited to the particular embodiments disclosed or to the operation according to my method. Thus, for example, the carriage drive, spray guns, and carriage drive control system may be used to apply paint to articles carried on a constantly moving conveyor system. This invention is not limited, therefore, to the specific embodiments disclosed, either in whole or in part, but is limited only by the appended claims.

What is claimed is:

1. In a machine of the class described, a conveyor system, spaced article carrying spindles on said conveyor system, means in said conveyor system to advance said spindles in alternate stationary and advancing periods, means to rotate successive spindles during stationary periods, a spray gun, means to support said spray gun at an angle having a component normal to the curved surface generated by an article carried by a rotating spindle during the stationary period of the spindle, and means to move said spray gun, along a linear path having a component parallel to the axis of said spindle, at a speed which varies substantially inversely to the change in surface area of the article carried by the spindle.

2. In a machine as defined in claim 1 in which said means to move said gun include a carriage track, a carriage reciprocable along said track, an arm on said carriage supporting said gun, and a variable speed drive for said carriage.

3. In a machine as defined in claim 1 in which said means to move said gun include a carriage track, a carriage reciprocable along said track, an arm on said carriage supporting said gun, a variable speed drive for said carriage, and gun spacing means to maintain said gun substantially constantly spaced from the approximate surface generated by an article carried by said spindle during a portion of the travel of said carriage in said track.

4. In a machine as defined in claim 1 in which said means to move said gun include a carriage track, a carriage reciprocable along said track, an arm on said carriage supporting said gun, gun spacing means to maintain said gun substantially constantly spaced from the approximate surface generated by an article carried by said spindle during a portion of the travel of said carriage in said track, and means actuated by said gun spacing means to maintain said gun substantially normal to the said surface while said gun is maintained constantly spaced from said surface.

5. In a machine as defined in claim 1 in which said means to move said gun include a carriage track, a carriage reciprocable along said track, an arm on said carriage supporting said gun, gun spacing means to maintain said gun substantially constantly spaced from the approximate surface generated by an article carried by said spindle during a portion of the travel of said carriage in said track, and means independent of said gun spacing means to maintain said gun substantially normal to the said surface while said gun is maintained constantly spaced from said surface.

6. In a machine as defined in claim 1 in which said means to move said gun include a carriage track, a carriage reciprocable along said track, an arm on said carriage supporting said gun, gun spacing means to maintain said gun substantially constantly spaced from the approximate surface generated by an article carried by said spindle during a portion of the travel of said carriage in said track, means to maintain said gun normal to the said surface, and means to move said carriage in said track at a rate of speed substantially inversely proportional to the area of the integer of said surface to which said gun is directed.

7. In a machine of the class described, a carriage track, a carriage reciprocable along said track, a gun arm journaled in said carriage for movement in a direction having a component transverse to said track, a spray gun pivoted on said arm, means to move said arm, means to tilt said gun, an endless carriage driving member, means connecting said carriage to said carriage driving member, and a carriage drive shaft driving said carriage driving member.

8. In a machine of the class described, a first mechanism as defined in claim 7, a second mechanism as defined in claim 7, a carriage drive control system associated with said first mechanism to drive and vary the speed of said carriage drive shaft, and a connecting shaft connecting the carriage drive shaft of said first mechanism to the carriage drive shaft of said second mechanism, whereby said carriage drive control system controls the carriage of said first and said second mechanisms.

9. A machine as defined in claim 7 in which the means for moving said gun arm comprise a cam track extending along said carriage track and a cam follower mounted on said gun arm and engaging said cam track.

10. A machine as defined in claim 7 in which the means for moving said gun arm comprise a cam track extending along said carriage track and a cam follower mounted on said gun arm and engaging said cam track, and the means for tilting said gun comprise a crank arm on said gun and a rod connecting said crank arm and said carriage.

11. A machine as defined in claim 7 in which the means for moving said gun arm comprise a first cam track extending along said carriage track and a cam follower mounted on said gun arm and engaging said cam track, and the means for tilting said gun comprise a crank arm on said gun, a cam arm journaled in said carriage parallel to said gun arm and connected to said crank arm, a second cam track extending along said carriage track and spaced from said first carriage track, and a cam follower mounted on said cam arm and engaging said second cam track.

12. In a machine of the class described, a carriage drive shaft, a sprocket on said carriage drive shaft, a carriage drive chain driven by said carriage drive sprocket, and a carriage drive control system comprising a motor, a timer, a timer driving shaft, a timer driven shaft, means connecting said motor to said timer driving shaft, means connecting said timer driven shaft to said carriage drive shaft, timer controlling means to vary the speed of said timer driven shaft relatively to said timer driving shaft, a timer cam shaft, speed reducing means connecting said carriage drive shaft to said cam shaft to drive said cam shaft through one revolution while said carriage drive chain is driven through one cycle, and a cam on said cam shaft actuating said timer controlling means to accelerate and decelerate said chain during its cycle.

13. A machine as defined in claim 12 in which the means connecting said motor to said timer driving shaft may vary the speed of said timer driving shaft relative to the speed of said motor to vary the time of the cycle of said carriage driving chain.

14. A machine as defined in claim 12 including a spray gun control valve, and a spray gun cam driven by said cam shaft to actuate said valve.

15. In a machine of the class described, a mechanism to vary the speed of a drive shaft through successive cycles of speed changes comprising a drive shaft; a timer comprised of an input shaft, a variable speed mechanism driven by said input shaft, an output member driven by said variable speed mechanism, and control means for said variable speed mechanism in said timer whereby operation of said control means will vary the speed of said timer output member relatively to the speed of said timer input shaft; means connecting said timer output member with said drive shaft, whereby said drive shaft will be driven by said timer input shaft; and means driven by said drive shaft to operate said timer control means in successive cycles.

16. In a machine of the class described, a mechanism to vary the length of time of the cycles of drive shaft speed changes in the mechanism defined in claim 15 comprising a motor and a variable speed drive connecting said motor to said timer input shaft.

17. In a machine of the class described, a mechanism to drive a drive shaft through cycles of speed changes and to vary the time of said cycles comprising a drive shaft, a first variable speed drive for driving said drive shaft and a control means for said first variable speed drive, said control means being driven by said drive shaft whereby said drive shaft will be driven through successive cycles of speed changes, a second variable speed drive for said first variable speed drive, and a second control means for said second variable speed drive whereby the operation of said second control means will vary the time of said cycles of speed changes of said drive shaft.

18. In a machine in which an element is to be accelerated and decelerated in cycles, an automatic drive comprising a rotatable drive shaft, a motor to rotate said drive shaft, means connecting said motor to said drive shaft including a variable speed mechanism and a control therefor, whereby operation of said control will vary the speed ratio between said motor and said drive shaft, a cam shaft, a cam on said shaft having a surface which varies from the locus of the mean throw of said shaft, a cam follower engaging the surface of said cam and operatively connected with said variable speed mechanism control whereby the instant speed of said drive shaft will vary with respect to its average speed proportionally to the variation of said surface with respect to the mean throw of said cam, and a cam shaft drive driven by said drive shaft, whereby the number of rotations of said drive shaft during a cycle is directly proportional to the ratio of said cam shaft drive.

19. In a machine in which an element is to be accelerated and decelerated in cycles, an automatic drive comprising a rotatable drive shaft, a motor to rotate said drive shaft, means connecting said motor to said drive shaft including a variable speed mechanism and a lever controlling said variable speed mechanism, and means driven by said drive shaft to operate said lever, whereby the rotation of said drive shaft by said motor through said variable speed mechanism operates to accelerate and decelerate said drive shaft due to the operation of said variable speed mechanism by said lever operating means driven by said drive shaft.

HOWARD V. SCHWEITZER.